(12) United States Patent
Vialen et al.

(10) Patent No.: US 7,328,013 B2
(45) Date of Patent: Feb. 5, 2008

(54) IDENTIFIER ALLOCATION METHOD

(75) Inventors: Jukka Vialen, Espoo (FI); Fabio Longoni, Espoo (FI)

(73) Assignee: Nokia Corporation, Espoo (FI)

( * ) Notice: Subject to any disclaimer, the term of this patent is extended or adjusted under 35 U.S.C. 154(b) by 216 days.

(21) Appl. No.: 11/103,757

(22) Filed: Apr. 12, 2005

(65) Prior Publication Data

US 2005/0186959 A1  Aug. 25, 2005

Related U.S. Application Data

(63) Continuation of application No. 09/914,308, filed on Oct. 17, 2001, now Pat. No. 6,898,429.

(51) Int. Cl.
*H04M 1/00* (2006.01)
(52) U.S. Cl. .................. 455/432.1; 455/450; 455/509; 370/328; 370/331
(58) Field of Classification Search ............ 455/432.1, 455/450, 509, 455, 435.1, 436, 524, 451, 455/457.1; 370/328, 331
See application file for complete search history.

(56) References Cited

U.S. PATENT DOCUMENTS

| | | | |
|---|---|---|---|
| 5,123,111 A * | 6/1992 | Delory et al. ............ 455/432.1 |
| 5,642,356 A | 6/1997 | Wenk .......................... 370/337 |
| 5,729,537 A * | 3/1998 | Billstrom ..................... 370/329 |
| 5,740,535 A | 4/1998 | Rune ......................... 455/437 |
| 6,031,827 A | 2/2000 | Rikkinen et al. ........... 370/330 |
| 6,119,000 A * | 9/2000 | Stephenson et al. ..... 455/432.1 |
| 6,208,864 B1 * | 3/2001 | Agrawal et al. ............ 455/445 |
| 6,374,112 B1 * | 4/2002 | Widegren et al. ......... 455/452.2 |
| 6,430,163 B1 | 8/2002 | Mustajarvi ................... 370/310 |
| 6,459,680 B1 * | 10/2002 | Alperovich et al. ........ 370/230 |
| 6,879,832 B1 * | 4/2005 | Palm et al. ................. 455/445 |
| 2003/0130008 A1 | 7/2003 | Rajaniemi et al. .......... 455/551 |

FOREIGN PATENT DOCUMENTS

| | | |
|---|---|---|
| EP | 0 639 036 A2 | 2/1995 |
| EP | 0 649 267 A2 | 4/1995 |
| EP | 0 805 609 A2 | 11/1997 |
| EP | 0 978 958 A1 | 2/2000 |
| JP | 10-190621 | 7/1998 |
| JP | 10-511829 | 11/1998 |
| WO | WO 95/10922 | 4/1995 |
| WO | WO 97/00568 | 1/1997 |
| WO | WO 98/05176 | 2/1998 |
| WO | WO 98/48528 | 10/1998 |
| WO | WO 98/49846 | 11/1998 |

OTHER PUBLICATIONS

Translation of Japanese Office Action dated Jul. 9, 2004 for Japanese Patent Application No. 2000-604622, 2 pgs.

* cited by examiner

*Primary Examiner*—Congvan Tran
(74) *Attorney, Agent, or Firm*—Harrington & Smith, PC

(57) ABSTRACT

The invention concerns signalling methods in cellular telecommunication systems, especially in so called third generation cellular systems, such as the UMTS system. In the inventive method the network checks, if the mobile station is in or is about to enter into such a state, in which the mobile station needs a c-RNTI, and if that is the case, the c-RNTI is indicated to the mobile station. Preferably, the indication is effected by attaching the c-RNTI identifier to a message, which causes the change of the mobile station to the state, in which the mobile station needs the c-RNTI identifier.

15 Claims, 3 Drawing Sheets

IDENTIFIER ALLOCATION METHOD

CROSS REFERENCE TO RELATED APPLICATIONS

This application is a Continuation of U.S. patent application Ser. No. 09/914,308, filed Oct. 17, 2001, now U.S. Pat. No. 6,898,429 which claims priority from Application filed in Finland on Mar. 10, 1999, No. 990527.

TECHNICAL FIELD OF THE INVENTION

The invention concerns signalling methods in cellular telecommunication systems, especially in so called third generation cellular systems, such as the UMTS system. More precisely, the invention is directed to a method according to the preamble of the first independent claim.

BACKGROUND OF THE INVENTION

Some of the abbreviations used in this application are as follows:
CCCH Common Control Channel
DCCH Dedicated Control Channel
DRNC Drift Radio Network Controller
DTCH Dedicated Traffic Channel
FACH Forward Link Access Channel
IMSI International Mobile Subscriber Identity
PCCH Paging Control Channel
PCH Paging Channel
PLMN Public Land Mobile Network
P-TMSI Packet Temporary Mobile Subscriber Identity
RACH Random Access Channel
RNC Radio Network Controller
RNSAP Radio Network System Application Part
RNTI Radio Network Temporary Identity
RRC Radio Resource Control
TFCS Transport Format Combination Set
TFS Transport Format Set
TMSI Temporary Mobile Subscriber Identity
UE User Equipment
UMTS Universal Mobile Telecommunication System
UTRAN UMTS Terrestrial Radio Access Network For clarification of common terms used in this document, an overview of certain cellular telecommunication system configurations is presented in the following.

Proposals for third-generation systems include UMTS (Universal Mobile Telecommunications System) and FPLMTS/IMT-2000 (Future Public Land Mobile Telecommunications System/International Mobile Telecommunications at 2000 MHz). In these plans cells are categorised according to their size and characteristics into pico-, nano-, micro- and macrocells, and an example of the service level is the bit rate. The bit rate is the highest in picocells and the lowest in macrocells. The cells may overlap partially or completely and there may be different terminals so that not all terminals necessarily are able to utilise all the service levels offered by the cells.

FIG. 1 shows an exemplary block diagram of a possible structure of a third generation cellular network. Such networks typically comprise a core network 50 connected to one or more radio access networks 40 (RAN). Such radio access networks are often referred to as UTRAN networks (UMTS Terrestrial Radio Access Network). The radio access networks typically comprise at least a plurality of base stations 20a, 20b, 20c (BS) for realizing the radio connections to mobile stations 10a, 10b, and at least one radio network controller 30 (RNC) for controlling the base stations. The radio network controllers are connected to a mobile switching center (MSC) 60 in the core network.

More than one RNC may be involved with the connections of a single mobile station. Such a situation may result for example from handovers. For example, let us assume that mobile station 10a initiates connections while being in the cell of base station 20a, whereby the connections are initially in the control of RNC 30a. Later on the MS 10a moves to the cell of BS 20b, whereby the network performs a handover, in which the connections or at least some of them are transferred to BS 20b. In such a case, the connections now go from MSC 60 through RNC 30a to the RNC 30b, and finally to BS 20b. The two RNC's have slightly differing duties. The initial RNC is called the serving RNC (SRNC), and the second RNC is called the controlling RNC (CRNC). The second RNC is also often referred to as Drift RNC (DRNC). In the case of multi diversity connections, i.e. connections in which a single radio connection is effected with cooperation of multiple simultaneous connections via multiple base stations, there may be more than one controlling RNC's, each controlling one or more of the sub-connections of the multidiversity connection. The duties of a SRNC may be transferred to another RNC in order to optimize the connections within the cellular network. Such a process is called a serving RNC relocation.

Further, in the current specifications for third generation cellular systems, the interface between two RNC:s is called the Iur interface, and the interface between a MSC and a RNC is called the Iu interface. These interface names are used in this application.

Mobile stations, which in UMTS terminology are typically named as User Equipment (UE), need naturally be identified in some way within the UTRAN. Temporary identifiers called Radio Network Temporary Identifiers (RNTI) are used as UE identifiers within an UTRAN and in signalling messages between the UE and the UTRAN. The RNTI identifiers are used and defined by the RNC's. Two types of RNTI are used in signalling messages between the UE and the UTRAN. One is used within and allocated by the SRNC and it is called the Serving RNC RNTI (s-RNTI). The other type is used within and allocated by a CRNC, when applicable, and it is called the Controlling RNC RNTI (c-RNTI). C-RNTI is often also called "Cell RNTI".

A s-RNTI is allocated for all UEs having a RRC connection, it is allocated by the Serving RNC and it is unique within the Serving RNC. A s-RNTI is reallocated always when the Serving RNC for the RRC connection is changed. In addition, each RNC has an identifier, called the RNC identifier (RNC-ID). Together the RNC-ID and s-RNTI form a unique UE identifier within the UTRAN. For this unique UE identifier, the term UTRAN-RNTI (U-RNTI) may be used. A c-RNTI is allocated for an UE by each CRNC through which the UE is able to communicate on a DCCH channel. A c-RNTI is unique within the allocating CRNC. The signalling procedures in the 3GPP specifications allow c-RNTI to be unique also within one cell. A c-RNTI is always allocated when a new UE context is created in a CRNC.

Communication channels used for data transfer are grouped into two categories: common transport channels and dedicated transport channels.

Common transport channels where UE identification is performed by using the RNTIs comprise, according to current specifications, the following channels, among others:

Random Access Channel (RACH), which is used for transmission of relatively small amount of data, e.g. signalling for initial access or non-realtime dedicated control or traffic data, Forward Access Channel (FACH), which is a downlink channel without closed-loop power control, and which is used for transmission of relatively small amounts of data, e.g. signalling (response) for initial access or non-realtime dedicated control or traffic data, Paging Channel (PCH), which is a downlink channel used for broadcast of control information such as paging and notification information into an entire cell.

According to current specifications the dedicated transport channel types comprise the following channel types, among others:

Dedicated Channel (DCH), which is a channel dedicated to one UE, and which can be used for uplink or downlink data transmission.

Each transport channel has an associated Transport Format or an associated Transport Format Set. A Transport Format is a combination of various transmission parameters such as encodings, interleaving, bit rate and mapping onto physical channels. A Transport Format Set is a set of Transport Formats. For example, a variable rate DCH channel has a Transport Format Set i.e. one Transport Format for each available transmission rate, whereas a fixed rate DCH has a single Transport Format.

A third generation UE can be in many different states in relation to the network. If no connections are present, the UE is in the idle mode. When at least one signalling connection exists, the UE is in connected mode. The connected mode has two main states: an URA connected state and a cell connected state. The URA connected state may also be called URA_PCH state to reflect that UE is reachable only via paging channel (PCH). In the URA connected state, the position of the UE is known on URA (UPS Registration Area) level. An URA consists of a plurality of cells within a certain geographical area In the cell connected state, the position of the UE is known in the cell level or in the active set level. All data transmission is effected in the cell connected state.

The cell connected state is further divided into a number of substates. Each state is associated with certain communication channels and other parameters. Therefore, the different states are typically denoted by the communication channels in use in the state. Further, the various communication channels have different properties. This collection of states and corresponding transport formats and channel types provide for different QoS levels, which can be provided for a UE.

According to the current specifications, the cell connected state has at least the following groups of substates:

In the DCH/DCH and DCH/DCH+DSCH substates, which may also be both called simply the CELL_DCH substate, a dedicated transport channel is allocated to the UE. In these states, the UE may transmit data up to the peak capacity that is currently granted to that UE.

In the RACH/FACH substate, which may also be called CELL_FACH substate, the UE monitors a FACH channel. It may transmit uplink control signals and may transmit small data packets on the RACH channel. Consequently, this state is used by UE's which do not need high amounts of transmission capacity.

In the PCH substate, which may also be called CELL-_PCH substate, the UE listens to the PCH transport channel. The network needs to make a paging request on the PCCH logical channel in the known cell in order to initiate any downlink activity. For any uplink activity, the UE moves to the RACH/FACH substate.

A UE may be transferred from DCH to RACH/FACH state for example as a result of the following RRC procedures:

Transport channel reconfiguration, in which a transport channel is changed from a dedicated to a common channel, for example for a NRT bearer.

Radio bearer (RB) release, in which at least one bearer is released, and the last remaining one is a non-real time (NRT) bearer which is currently not active or is which is configured to use common channels.

Physical channel reconfiguration, which procedure may assign, replace or release a set of physical channels used by an UE. A physical channel reconfiguration procedure may also change the used transport channel type and RRC state.

Radio bearer (RB) reconfiguration, in which parameters for a radio bearer or a signalling link (which may also be called Signalling Radio Bearer SRB) are reconfigured to reflect a change in required QoS level. A RB reconfiguration procedure may comprise for example changing of RLC parameters, changing of multiplexing priority for DTCH/DCCH or between DTCHs mapped to same DCH, changing of DCH scheduling priority, changing of TFS for DCH, change of TFCS, assigning or releasing of physical channel(s) and changing of used transport channel types.

The signalling according to prior art in the case of the four previous procedures is similar: they are started by the serving RNC which sends a XXX message to the UE, which replies with a XXX Complete message, in which XXX refers to the particular procedure in question.

A UE is aware of its c-RNTI only when in RACH/FACH state, while c-RNTI is used as a UE identifier within UTRAN in all UE states. A further refinement of this mechanism allows the UTRAN to use a separate identifier for the UE within UTRAN, the drift RNTI (d-RNTI), instead of the c-RNTI. d-RNTI, as c-RNTI is allocated by the controlling RNC in all the UE states, and it is used to identify the UE in the messages directed from SRNC to the CRNC, when needed.

S-RNTI together with the RNC-ID is used as a UE identifier in almost all CCCH messages and in UTRAN originated PCCH messsages on the air interface. The only exception is the initial RACH messages on CCCH where either a random number or some existing UE core network identifier such as IMSI, TMSI, or P-TMSI is used, because the s-RNTI is not allocated yet at that time. RNC-ID is used by a Controlling RNC to route the received uplink messages towards the Serving RNC.

C-RNTI is used as a UE identifier in DCCH/DTCH common channel messages on air interface. The main benefit of using c-RNTI instead of the combination of a s-RNTI and a RNC-ID in the air interface is to shorten the common channel messages and thus save capacity on common radio channels.

A problem with the current specifications for third generation cellular systems is signalling of the c-RNTI to the UE in some situations, such as:

when LE in RACH/PCH state is paged to move it to RACH/FACH state, when UE is moved from DCH state to RACH/FACH state, and when UE starts a CCCH procedure (e.g. Cell update) using a CRNC different from the SRNC.

A known solution to these problems is to use the Cell Update procedure after packet paging or after a DCH-CCH transition for obtaining the new c-RNTI. However, this solution causes too much signalling on RACH/FACH channels. The capacity of the RACH/FACH channels is limited, and any signalling on these channels should be brought to a minimum. A better solution is therefore needed.

SUMMARY OF THE INVENTION

An object of the invention is to realize a method, which alleviates the problems of the prior art. A further object of the invention is to realize a method, which reduces signalling as compared to the known solutions.

The objects are reached by realizing a method, in which the network checks, if a state change is needed for a mobile station, and in which a controlling radio network controller allocates a temporary mobile station identifier for a mobile station, and in which said temporary mobile station identifier is indicated to said mobile station. Preferably, the indication is effected by attaching the identifier to a message, which causes the change of the mobile station to the state, in which the mobile station needs the identifier.

The method according to the invention is characterized by that, which is specified in the characterizing part of the independent method claim. The dependent claims describe further advantageous embodiments of the invention.

BRIEF DESCRIPTION OF THE DRAWINGS

The invention is described in more detail in the following with reference to the accompanying drawings, of which

Same reference numerals are used for similar entities in the figures.

DETAILED DESCRIPTION

Figure 1:
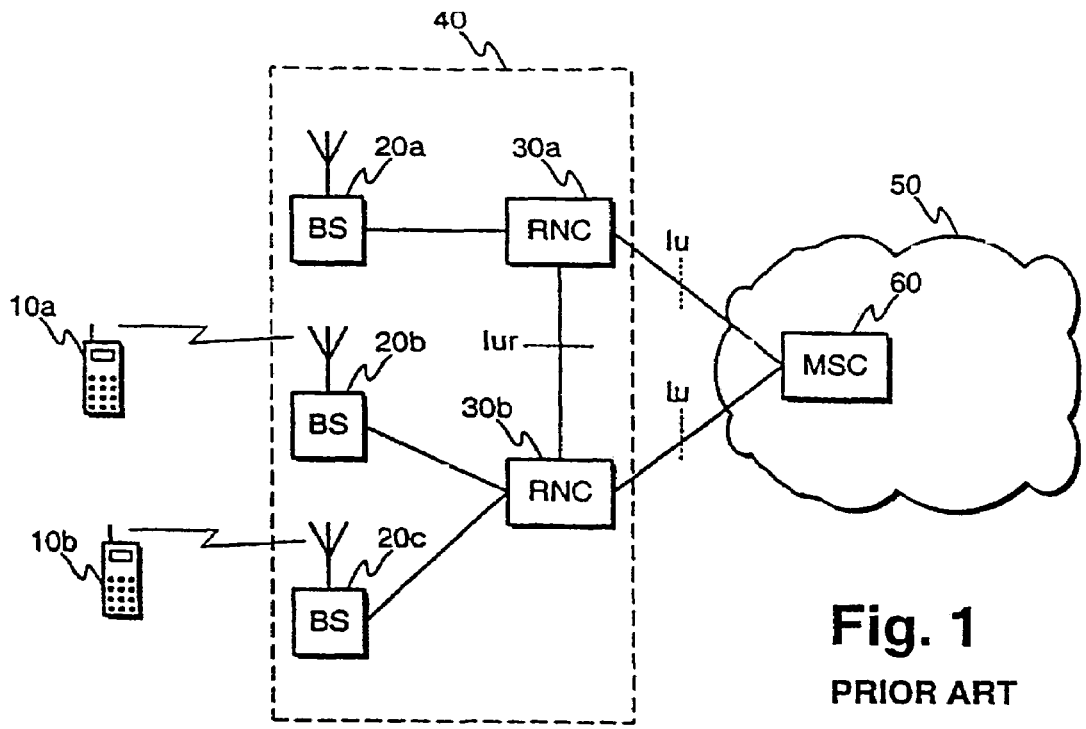
FIG. 1 illustrates a cellular network structure according to prior art.
Figure 2:
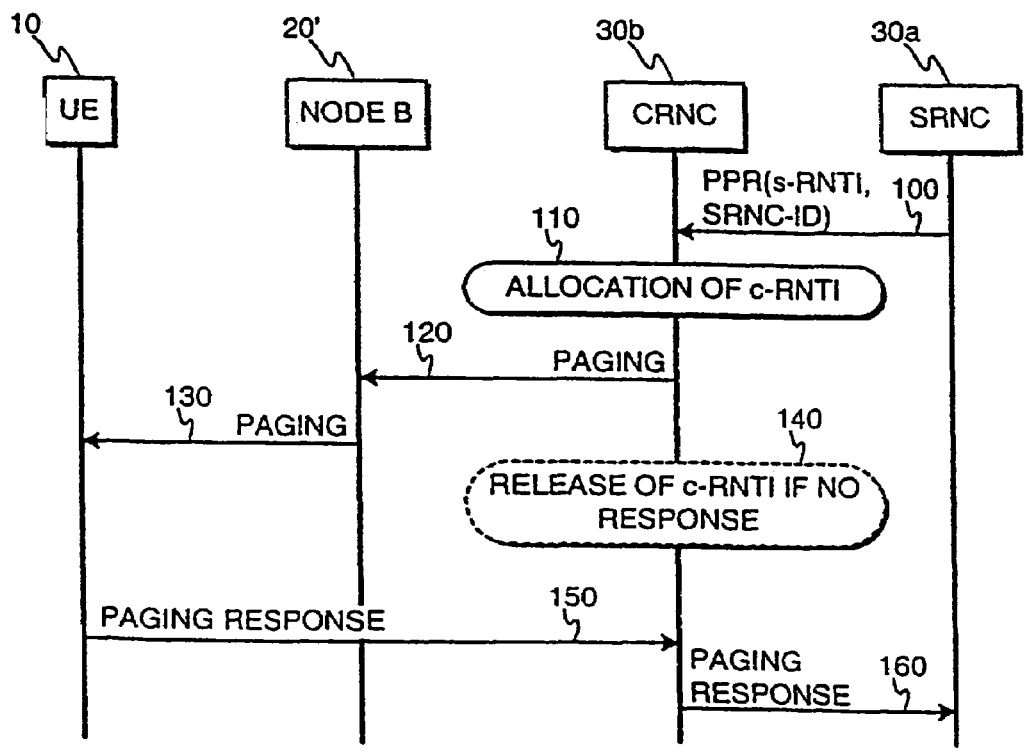
FIG. 2 illustrates signalling according to an advantageous embodiment of the invention.

FIG. 2 illustrates signalling according to an advantageous embodiment of the invention. FIG. 2 illustrates signalling between a UE 10, a base station NODE B 20', a CRNC 30b, and a SRNC 30a. In the present specifications of third generation cellular system, a base station is represented by a logical-network element Node B, which is the reason for the notation NODE B in this application. This embodiment provides a solution for providing the information of c-RNTI to the UE in the case of paging of the UE to move it from RACH/PCH state to RACH/FACH state.

In the first step, the the SRNC sends 100 a PACKET PAGING REQUEST (PPR) message to the CRNC, attaching the S-RNTI and SRNC-ID identifiers as parameters to the message. After receiving the message, the CNRC allocates 110 a c-RNTI identifier for the UE, and sends a PAGING message to NODE B 20', attaching SRNC-ID, s-RNTI, and the c-RNTI identifiers as parameters to the message. NODE B, that controls the scheduling of physical paging channels, sends 130 a paging message further to the UE. If the UE does not respond for any reason, the CRNC releases 140 the c-RNTI. However, in this example, the UE is able to receive the PAGING message, and replies by sending 150 a PAGING RESPONSE message, attaching the c-RNTI as a parameter to the message. The CRNC sends 160 a Paging Response message (or a generic UPLINK SIGNALLING TRANSFER INDICATION message carrying this information) of the Iur interface signalling protocol to the SRNC, attaching the c-RNTI to the message in order to inform the SRNC about the allocated c-RNTI.

Figure 3:
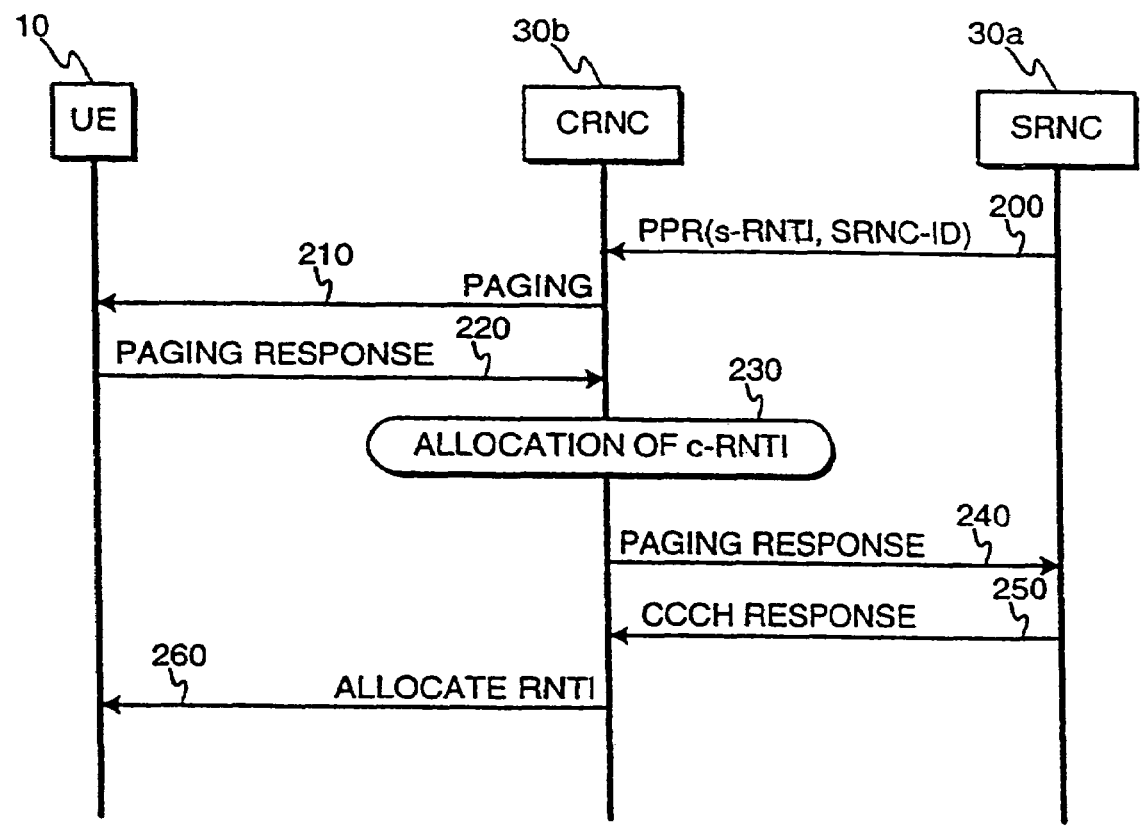
FIG. 3 illustrates signalling according to another advantageous embodiment of the invention.

FIG. 3 illustrates signalling according to an advantageous embodiment of the invention. FIG. 3 illustrates signalling between a UE 10, a CRNC 30b, and a SRNC 30a. For clarity, the NODE B network entity is not illustrated in FIG. 3. This embodiment provides a solution for providing the information of c-RNTI to the UE in the case of paging of the UE to move it from RACH/PCH state to RACH/FACH state. In this embodiment, the c-RNTI is allocated only after the UE responds to paging, and the c-RNTI is informed to the UE in a separate message.

In the first step, the the SRNC sends 200 a PACKET PAGING REQUEST (or simply a PAGING REQUEST) message to the CRNC, attaching the S-RNTI and SRNC-ID identifiers as parameters to the message. After receiving the message, the CNRC sends a PAGING message to the UE, attaching SRNC-ID and the s-RNTI identifiers as parameters to the message. The UE replies by sending 220 a PAGING RESPONSE message. After receiving the message, CRNC allocates 230 a c-RNTI identifier for the UE. After this step, the CRNC sends 240 a Paging Response command (or a generic UPLINK SIGNALLING TRANSFER INDICATION) of the Iur interface signalling protocol to the SRNC, attaching the c-RNTI to the command in order to inform the SRNC about the allocated c-RNTI. Finally, the SRNC informs the UE about the allocated c-RNTI by sending 250 for example a CCCH RESPONSE (can be called DOWNLINK SIGNALLING TRANSFER REQUEST) message to the CRNC, ordering the CRNC to send a message to the UE for indicating the c-RNTI. After receiving the CCCH RESPONSE message, the CRNC sends an ALLOCATE RNTI message to the UE, attaching the c-RNTI as a parameter to the message. Instead of an ALLOCATE RNTI message, the CRNC may also use some other messages for the same purpose, for example one of the SYSTEM_INFORMATION messages that are normally sent to UE in connected mode.

In another embodiment of the invention, the message including the c-RNTI is sent directly from SRNC to the UE using the normal message transfer mechanisms in Iur interface. In such an embodiment the CRNC only forwards the messages received from SRNC. This embodiment is advantageous in the case, in which the CRNC does not comprise a dedicated protocol entity for the UE, i.e. when the CRNC is not able to encode dedicated messages directed to one UE.

In a further advantageous embodiment of the invention, the allocated c-RNTI is used as such as identifier within the UTRAN, i.e. in the Iur interface, whereby no new identifiers are needed for that purpose. In such an embodiment, the c-RNTI is used as the identifier of the UE in messages from the SRNC to a CRNC, and the s-RNTI is used as the identifier of the UE in messages from a CRNC to the SRNC. A different identifier dedicated for that purpose (drift RNTI, d-RNTI) may also be used.

According to a further advantageous embodiment of the invention, the c-RNTI is indicated to the UE in a RRC message. This embodiment provides a solution for providing the information of c-RNTI to the UE in the case of transfer of the UE from DCH state to RACH/FACH state due to a RRC procedure, such as those four procedures described in the prior art.

In DCH state, the id used to identify the UE in the Iur interface, I.e. the c-RNTI or d-RNTI is allocated by the CRNC when the first radio link controlled by the CRNC is added to the active set. The c-RNTI/d-RNTI is signalled to the SRNC with the RNSAP Radio Link setup response message. Conversely, when radio links are removed from the active set, the SRNC indicates to the CRNC in the RNSAP radio link delete message if the c-RNTI/d-RNTI shall be released or not. The c-RNTI/d-RNTI shall be released if the radio link to be removed is the last one controlled by this CRNC. Since the c-RNTI is allocated during radio link addition, the c-RNTI is already known by the SRNC, when the RRC procedure, which causes the state change of the UE, is initiated.

In an advantageous embodiment of the invention, the SRNC can attach the c-RNTI as a parameter to the RRC message XXX_COMMAND, which initiates the state change. Here, XXX means the particular RRC procedure in question.

The procedure described in the previous paragraph can advantageously be used, if all cells in the active set are controlled by the same CRNC, i.e. only one c-RNTI corresponds to the UE, and the UE is limited to selecting a cell to be used in the RACH/FACH state from those cells. In the case that the cells in the active set are under control of more than one CRNC and the UE is allowed to make the final decision about which cell to use in RACH/FACH state, the situation is more complicated. In that case the SRNC can attach the c-RNTI for each cell in the active set to the XXX_COMMAND message.

In a further advantageous embodiment of the invention, the SRNC is arranged ask for the c-RNTI with a separate procedure.

Figure 4:
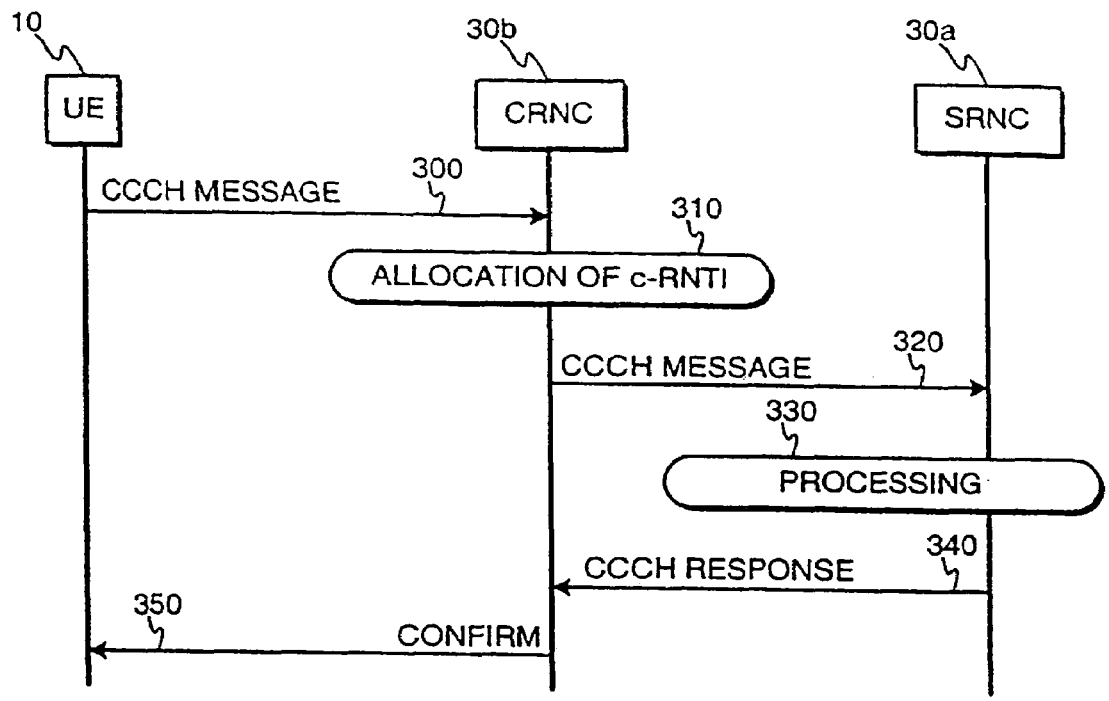
FIG. 4 illustrates signalling according to a further advantageous embodiment of the invention.

FIG. 4 illustrates signalling according to an advantageous embodiment of the invention. FIG. 4 illustrates signalling between a UE 10, a CRNC 30*b*, and a SRNC 30*a*. This embodiment provides a solution for providing the information of c-RNTI to the SRNC and the UE in the situation, in which the UE starts a CCCH or DCCH procedure using a new CRNC. In this embodiment, the CCCH or DCCH procedure may be for example Cell Update, URA Update, RRC Connection Re-establishment, or paging response procedures.

In the first step 300, the LE sends a CCCH or DCCH message to the CRNC. Examples of such messages are the CELL UPDATE message, URA UPDATE message, RRC CONNECTION RE-ESTABLISHMENT message, or PAGING RESPONSE message. The CRNC observes, that the UE is unknown to it, and therefore allocates 310 a c-RNTI identifier for the UE. Next, the CRNC forwards 320 the message in a RNSAP message (such as for example UPLINK SIGNALLING TRANSFER INDICATION) over the Iur interface to the SRNC, attaching the allocated c-RNTI as a parameter to the message. In the next step 330, the SRNC performs the processing associated with the procedure in question. For example, in the case of an URA UPDATE procedure, in step 330 the SRNC decides whether or not to perform a SRNC relocation, and performs the relocation if necessary. Finally, the SRNC orders the CRNC to reply to the UE by sending 340 a CCCH response message (for example the DOWNLINK SIGNALLING TRANSFER REQUEST message) to the CRNC, and the CRNC sends 350 to the UE a CONFIRM message corresponding to the original message of the UE sent in step 300.

In another embodiment of the invention, the message including the c-RNTI is sent directly from SRNC to the UE using the normal message transfer mechanisms in Iur interface.

Figure 5:
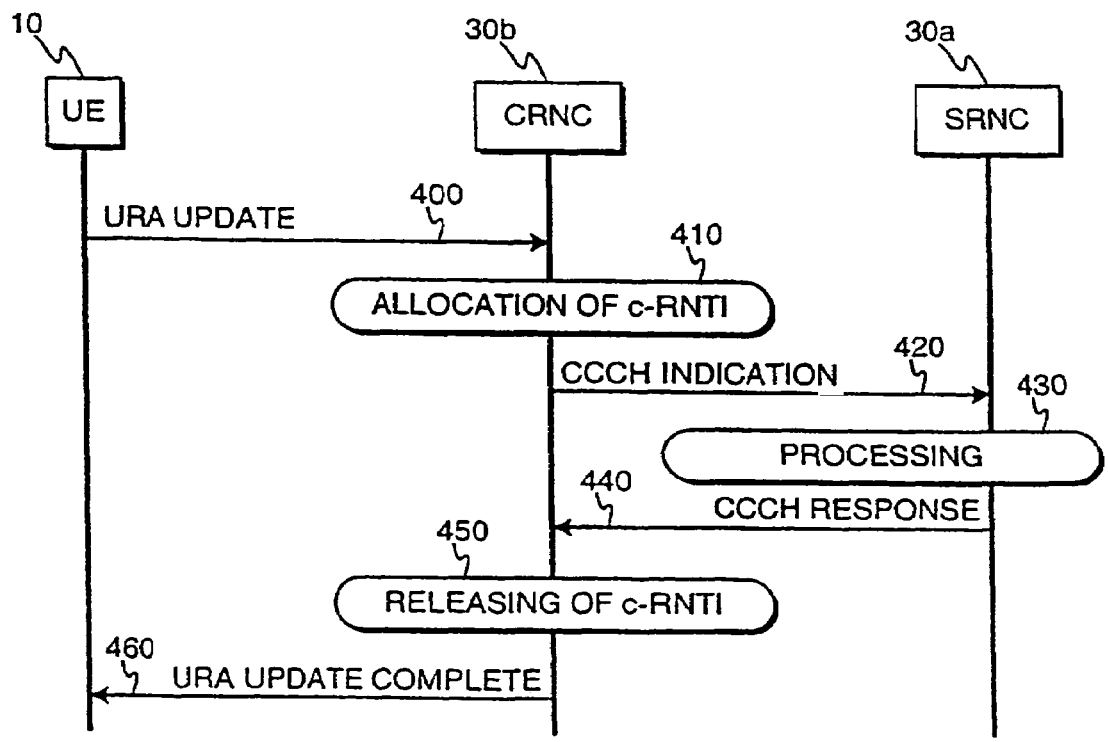
FIG. 5 illustrates signalling according to a still further advantageous embodiment of the invention.

FIG. 5 illustrates signalling according to an advantageous embodiment of the invention. FIG. 5 illustrates signalling between a UE 10, a CRNC 30*b*, and a SRNC 30*a*. In this embodiment, the SRNC indicates to the CRNC whether a c-RNTI shall be released. This is achieved by including one additional parameter to the RNSAP message. Such a parameter can be for example a RNTI release indicator, to indicate if the UE context and any resource allocated to the UE context shall be released. The SRNC effects this by using a RNSAP message, which is used to transfer a RRC message to the UE. Such message can be for example the DOWNLINK SIGNALING TRANSFER REQUEST message. In the example of FIG. 5, the example is presented in connection with a URA UPDATE procedure.

In the first step 400, the UE sends an URA UPDATE message to the UTRAN. The CRNC observes, that the UE is unknown to it, and therefore allocates 410 a c-RNTI identifier for the UE. Next, the CRNC forwards 420 the message received from UE in a RNSAP message CCCH INDICATION (or UPLINK SIGNALLING. TRANSFER INDICATION) over the Iur interface to the SRNC, attaching the allocated c-RNTI as a parameter to the RNSAP message. In the next step 430, the SRNC performs the processing associated with the procedure in question, i.e. in the example of FIG. 5, the decision whether or not to perform a SRNC relocation. In this example, SRNC relocation is not needed. Next, the SRNC orders the CRNC to reply to the UE by sending 440 a CCCH RESPONSE message to the CRNC. The SRNC attaches to the RNSAP message an indication, that the c-RNTI shall be released. This is advantageous since in the RACH/PCH state, the UE cannot use the c-RNTI before making a cell update, whereby it is unnecessary to keep the c-RNTI allocated. As a consequence, the CRNC releases 450 the c-RNTI, and sends 460 to the UE a CONFIRM message corresponding to the original message of the UE sent in step 400. In other embodiments of the invention, the CONFIRM message can be sent directly from SRNC to the UE using the normal message transfer mechanisms in Iur interface.

The invention reduces the amount of signalling between the UE and the network, especially in the RACH and FACH channels. The invention also reduces signalling in the Iur interface in the network. Further, the invention reduces amount of processing in the UE and in the network, since amount of messaging is decreased. This is very important regarding the UE, since any messaging over the radio interface consumes energy, which is a critical resource in typical battery-operated mobile handsets.

The invention can be advantageously applied in third generation cellular systems, such as the UMTS (Universal Mobile Telecommunication System) or the IMT2000 cellular system.

The name of a given functional entity, such as the radio network controller, is often different in the context of different cellular telecommunication systems. For example, in the GSM system the functional entity corresponding to a radio network controller (RNC) is the base station controller (BSC). Therefore, the term radio network controller in the specification and in the claims is intended to cover all corresponding functional entities regardless of the term used for the entity in the particular cellular telecommunication system. Further, the various message names such as the PACKET PAGING REQUEST, CCCH INDICATION, and other message names recited in this application are intended to be examples only, and the invention is not limited to using the message names recited in this application.

In the previous examples, the RRC messaging between the UE and the UTRAN terminate in the UTRAN side in the CRNC. However, this is not intended as a limitation to the invention, since the RRC messaging can also be arranged to terminate in the SRNC. In that case, the CRNC merely forwards the RRC messages. Further, the previous examples show the CRNC and the SRNC to be separate network elements. However, the invention is also applicable in the basic case, when only one RNC participates in the connections of the UE. In that case, the SRNC and the CRNC are the same network elements, and the Iur interface signalling is merely an internal procedure within the RNC.

The term mobile station is used in the claims to denote a UE or a corresponding mobile communication means. In the claims, the term temporary mobile station identifier refers to a c-RNTI or a corresponding temporary identifier allocated and used by a radio network controller.

In view of the foregoing description it will be evident to a person skilled in the art that various modifications may be made within the scope of the invention. While a preferred embodiment of the invention has been described in detail, it should be apparent that many modifications and variations thereto are possible, all of which fall within the true spirit and scope of the invention.

The invention claimed is:

1. A network entity for operating in a radio access network of a cellular telecommunications network and communicating with mobile stations within an area covered by the radio access network, the mobile stations being operable in one of at least a first state in which the mobile station listens to a paging channel, a second state in which the monitors a forward access channel, and a third state in which a dedicated transport channel is allocated to a mobile station, said network entity comprising:
   at least one radio network controller;
   means for determining whether a state change to the second state is required for a first mobile station in communication with the radio access network;
   means for allocating a temporary mobile station identifier unique within a cell of the radio access network for the first mobile station if the state change to the second state is required; and
   means for indicating the temporary mobile station identifier to the mobile station.

2. The network entity of claim 1, wherein said at least one radio network controller comprises a controlling radio network controller for the first mobile station, said controlling radio network controller comprising said means for allocating.

3. The network entity of claim 2, wherein said controlling radio network controller comprises said means for indicating.

4. The network entity of claim 2, wherein said at least one radio network controller comprises a serving radio network controller for the first mobile station, said serving radio network controller comprising said means for indicating.

5. The network entity of claim 1, wherein said at least one radio network controller comprises only one radio network controller.

6. The network entity of claim 2, wherein said at least one radio network controller comprises only one radio network controller.

7. The network entity of claim 1, wherein said network entity is formed by a radio network controller.

8. The network entity of claim 2, wherein said network entity is formed by said controlling radio network controller.

9. The network entity of claim 2, wherein said controlling radio network controller is arranged and dimensioned for allocating the temporary mobile station identifier for the first mobile station in response to receiving a paging request for the first mobile station from a serving radio network controller of the first mobile station, said controlling radio network controller being further arranged and dimensioned for indicating the allocated temporary mobile station identifier to the first mobile station by attaching said allocated temporary mobile station identifier as a parameter to a paging request transmitted to the first mobile station.

10. The network identity of claim 9, wherein said controlling radio network controller is further arranged and dimensioned for releasing the temporary mobile station identifier if a response to the paging request is not received from the first mobile station within a predetermined time period.

11. The network identity of claim 2, wherein said controlling radio network controller is arranged and dimensioned for allocating the temporary mobile station identifier for the first mobile station in response to receiving a paging request from the first mobile station, said controlling radio network controller being further arranged and dimensioned to indicate the temporary mobile station identifier to the first mobile station in a separate message.

12. The network identity of claim 1, wherein said means for indicating comprising means for indicating the temporary mobile station identifier to the first mobile station with a message that triggers a state change of the first mobile station from the third state to the second state.

13. The network entity of claim 1, further comprising means for identifying the first mobile station in signaling between two radio network controllers based on the temporary mobile station identifier.

14. The network entity of claim 1, further comprising means for using the temporary mobile station identifier for identifying the first mobile station in signaling between two radio network controllers.

15. The network entity of claim 1, wherein said radio access network is a third generation radio access network.

* * * * *